Nov. 28, 1950     A. U. BRYANT     2,531,607
COMPARTMENT TESTER
Filed April 15, 1947     3 Sheets-Sheet 1
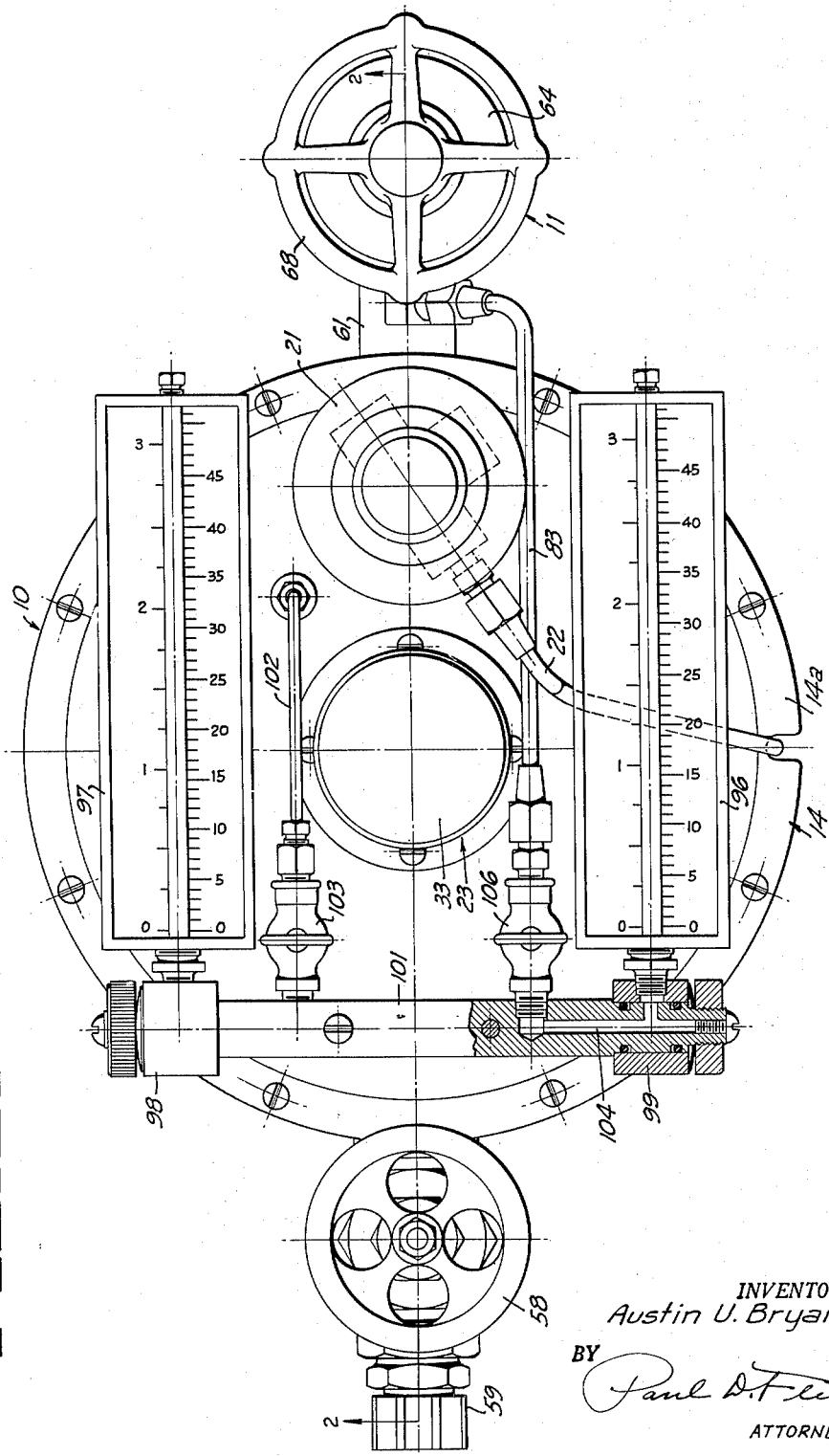
FIG-1
INVENTOR.
Austin U. Bryant
BY
ATTORNEY

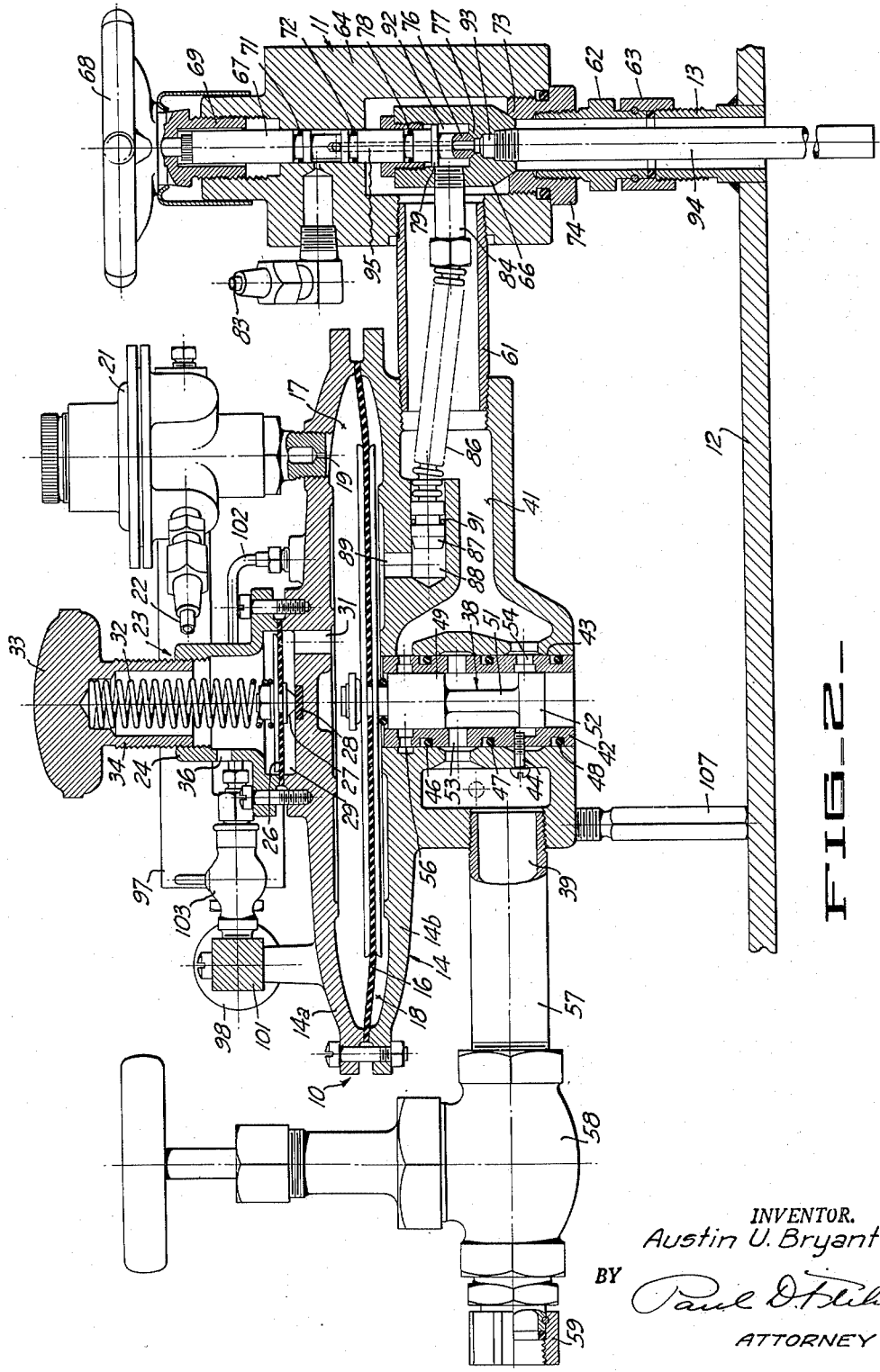

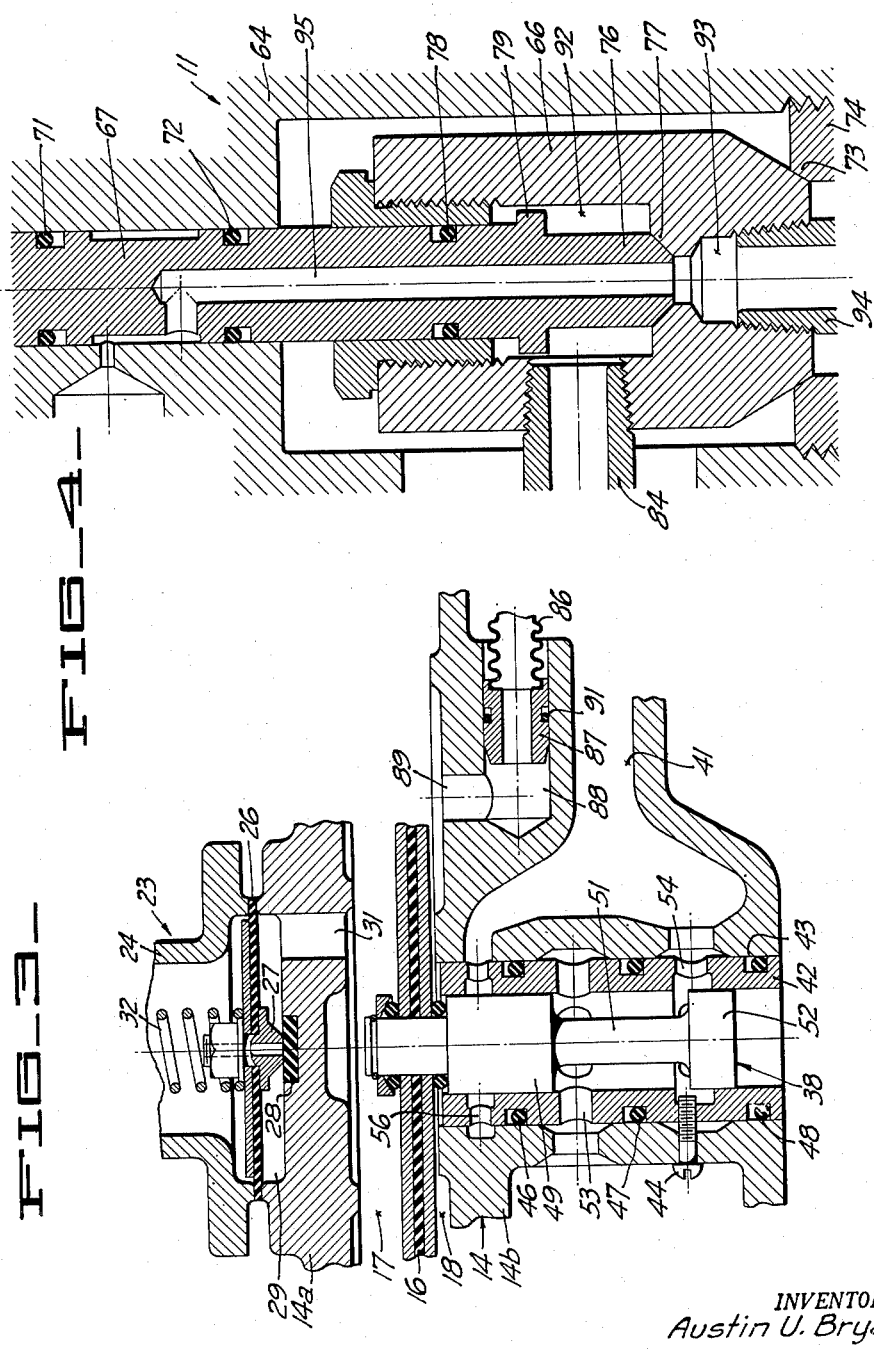

Patented Nov. 28, 1950

2,531,607

UNITED STATES PATENT OFFICE 2,531,607

COMPARTMENT TESTER

Austin U. Bryant, Berkeley, Calif., assignor to Grove Regulator Company, Oakland, Calif., a corporation of California Application April 15, 1947, Serial No. 741,639

4 Claims. (Cl. 73—40)

This invention relates generally to pneumatic equipment for the testing of tanks or compartments to detect the presence of possible leaks.

As described in co-pending application Serial No. 619,294 filed September 29, 1945, for "Compartment Testing Apparatus," in the name of Douglas H. Annin, it is conventional practice in compartment testing to connect the compartment to a source of air pressure until a predetermined pressure has been built up in the tank or compartment. The air inlet is then closed and the operator observes any possible drop of pressure over a predetermined period of time. The extent of any leak present is indicated by the amount which the pressure may drop over a prescribed time period. The testing apparatus disclosed in said application 619,294 is an improvement over conventional apparatus, and greatly facilitates making connections between the apparatus and the compartment, and the taking of accurate pressure readings under various testing conditions encountered. In addition the hazard of introducing too much pressure into a compartment (such as the compartment of a ship) is greatly minimized.

In the use of apparatus of the type disclosed in said application Serial No. 619,294, it has been found that inaccuracies may result in the pressure readings taken during the time the compartment is being supplied with air, due to the differences in static pressure which may exist between the outlet of the pressure regulator employed, and the interior of the tank or compartment. Also the time required to supply air to the compartment is extended due to the fact that the pressure regulator employed does not attain its maximum permissible flow rate.

It is an object of the present invention to improve compartment testing equipment of the type disclosed in said application Serial No. 619,294, particularly with respect to the accuracy of pressure readings afforded, and operation of the pressure reducing regulator to supply the required amount of air to the compartment.

Further objects of the invention will appear from the following description in which the preferred embodiment of the invention has been set forth in detail in conjunction with the accompanying drawing.

Referring to the drawing:

Figure 1 is a plan view of testing apparatus incorporating the present invention.

Figure 2 is a cross sectional view of the apparatus as shown in Figure 1 the section being indicated by the line 2—2 of Figure 1.

Figure 3 is an enlarged detail in section illustrating the construction of the presusre reducing regulator valve.

Figure 4 is an enlarged detail in section illustrating the construction of the manual control valve.

The apparatus illustrated in the drawings consists generally of a pressure reducing regulator 10, in conjunction with a manually operable valve 11. The tank or compartment to be tested is indicated by its one wall 12, and is shown provided with a short connecting pipe 13.

The pressure reducing regulator 10 consists generally of a body 14 formed of two separable parts 14a and 14b. The two body parts are provided with annular flanges and are clamped together upon the peripheral edge of a flexible operating diaphragm 16. The body is formed to provide chambers 17 and 18 upon opposite sides of the diaphragm, with chamber 17 being adapted to receive air under pressure to provide a desired loading upon the diaphragm, and chamber 18 adapted to receive controlling gas pressure. Air or like gas is continuously supplied to the chamber 17 through the restricted orifice 19 and from the small pressure reducing regulator 21. The inlet side of this regulator is connected by pipe 22 to a source of gas under pressure.

A desired pressure is maintained in space 17 by the small back pressure regulator 23. This regulator can consist of a body 24 which is clamped to the main regulator body 14a, and which encloses the flexible operating diaphragm 26. The diaphragm carries a small valve member 27 which is ported centrally, and which is adapted to engage the valve seat insert 28. Space 29 below the diaphragm 26 is in free communication with the space 17 above the main diaphragm 16, through the duct 31.

The diaphragm 26 is urged downwardly by the loading spring 32, the upper end of which is seated within the adjusting knob 33. This knob carries a threaded portion 34 which has threaded engagement with body 24, whereby upon turning the knob the compression of spring 32 can be adjusted to a desired value. The space about the diaphragm 26 is vented to the atmosphere through duct 36, and when the valve member 27 is moved upwardly away from the seat 28, air may vent from space 29 through the duct provided within this valve member.

It will be apparent that back-pressure regulator 23 serves to automatically maintain the desired pressure within the chamber 17, assuming that the small pressure reducing regulator 21 is adjusted to supply air continuously to chamber 17. Thus the loading upon the upper side of diaphragm 16 is determined by the pressure maintained by back-pressure regulator 23, and this loading can be adjusted by changing the setting of knob 33.

The main diaphragm 16 is operatively connected to valve means designated generally at 38, which serves to control flow of air from the inlet passage 39 to the outlet passage 41. The particular type of valve means illustrated is of the balanced slide type. It consists of a cylindrical shaped and ported sleeve 42 fitted within a cylindrical bore 43 formed in the body part 14b. The sleeve is retained in place by suitable means such as the screw 44 and it is sealed with respect to the body by suitable means such as the resilient O rings 46, 47, 48.

Slidably fitted within the sleeve 42 there is a piston 49 which is attached to the central portion of diaphragm 16, and is also rigidly connected by rod or stem 51 with the cylindrical slide valve member 52. Sleeve 42 is provided with porting 53 which communicates with the inflow passage 39, and also with porting 54 which communicates with the outflow passage 41. For the position of the valve 52 illustrated in solid lines in Figure 2 porting 54 is partially exposed by the valve member 52, and therefore air may flow from passage 39 through porting 53, the interior of the sleeve, and through porting 54 to the outlet 41. As valve member 52 is raised flow of air through porting 54 is reduced, and eventually porting 54 may be exposed below the lower end of valve member 52, thereby venting air from the outflow side to the atmosphere.

In addition to the porting described above it is desirable that sleeve 42 be ported as indicated at 56, and that this porting be in free communication with the outflow passage 41. Such porting tends to prevent the discharge of a jet of air upon the lower side of the diaphragm, such as may flow about the clearance between the piston 49 and the adjacent walls of the sleeve 42.

The inflow passage 39 is adapted to connect to a source of air under pressure by the use of suitable piping and coupling means. Thus a short pipe section 57 is shown threaded into the valve body and is connected with a manual valve 58. This valve in turn is shown connected with a coupling 59 whereby connections can be made to piping leading to the air supply.

Outflow passage 41 connects with a pipe section 61 which leads to the manual valve 11. The outflow side of valve 11 is provided with a fitting 62 and coupling 63 to facilitate making engagement with a tank or compartment.

The manual valve 11 is of special construction and in this instance consists of a body 64 which accommodates the valve member 66. The valve member is attached to an operating rod 67 extending to the exterior of the valve body, where it is operatively attached to the hand wheel 68. The hand wheel carries a bushing 69 which has threaded engagement with the valve body whereby when the hand wheel is turned rod 67 is moved to valve member 66 between open and closed position. Suitable sealing means such as the O rings 71 and 72 prevent leakage between the body and the stem. In its closed position valve member 66 engages the stationary seat 73 which is carried on the inner end of fitting 74.

In conjunction with the main valve member 66 secondary valve means is provided consisting of valve member 76 formed on the inner end of rod 67, and a relatively stationary seat 77 formed on the valve member 66. Rod 67 is slidably fitted within the valve member 66, and sealed with respect to the same by suitable means such as the O ring 78. Relative movement between these parts is limited by collar 79. Thus when rod 67 is moved inwardly of the body 64 by the turning of the hand wheel 68, valve member 66 is forced to closed position upon its seat 73, and likewise secondary valve member 76 is seated in closed position upon the seat 77. When valve rod 67 is moved in an opposite direction valve member 66 moves to open position with respect to each seat, and ultimately movement occurs between rod 67 and member 66 whereby secondary valve member 76 is opened with respect to seat 77.

Suitable piping is provided for making connection between the chamber 18 below the main diaphragm 16, and the interior of the compartment under test, and this piping establishes communication through the secondary valve means described above, and also includes pipe sections which extend through the pipe 61, the coupling 63 and the pipe 13. Thus a short rigid pipe section 84 is threaded into the valve member 66, and extends within the pipe section 61. A flexible or bendable pipe section 86 connects pipe section 84 with a sleeve 87 which is slidably fitted within a bore 88 formed in the regulator body part 14b. Bore 88 is in free communication with chamber 18 through the port 89. Suitable means such as a resilient O ring 91 serves to seal against leakage past the sleeve 87. The arrangement just described establishes communication between chamber 18 and the space 92 within the valve member 66, while at the same time permitting movement of valve 66 between open and closed positions. Space 93 on the outflow side of the secondary valve connects with a pipe section 94, which leads axially through the coupling 63 and pipe section 13, and terminates at a point well within the compartment under test.

It will be apparent from the foregoing that when the secondary valve member 76 is closed upon its seat, communication between the chamber 18 below the main diaphragm 16 and the interior of the compartment is interrupted. At that time a duct 95 in rod 67 establishes communication between pipe 94 and an exterior pipe 83 which is attached to the upper part of the valve body. Thus a pressure measuring device to be presently described, and which is connected with pipe 83 is placed directly in communication with the interior of the compartment whereby the pressure within the compartment can be read for the purpose of determining whether or not any pressure loss occurs over a period of time. When the valve member 66 is in full open position with the secondary valve 76 likewise open, the indicating means attached to pipe 83 indicates generally the static pressure of air being supplied to the compartment by the main pressure reducing regulator. Likewise space 18 below the diaphragm 16 is automatically placed in communication with the interior of the compartment in a manner previously described.

In conjunction with the main regulator 10 it is desirable to provide pressure indicating means which will serve to accurately record the loading of the main regulator, and also the pressure within the compartment. As shown in Figure 1 this indicating means can consist of a pair of mercury manometers 96 and 97. These manometers are attached to sleeves 98 and 99 which are rotatably mounted upon the end of a rod 101. The pressure chamber on manometer 97 connects through porting and ducts with a tube 102, which leads to the loading chamber 17 above the diaphragm 16. This tube is shown provided with a small petcock 103 to enable opening or closing of the same. Manometer 96 has its pressure chamber connected through duct 104 with the pipe 83. This pipe is likewise provided with a small petcock 106. The mounting of the two manometers 96 and 97 in the manner described facilitates use of the apparatus in either horizontal or vertical position. For a horizontal position as shown in Figure 2, the manometers are swung upwardly at 90° with respect to the general plane of the main regulator 10, whereby they are read in a vertical position. In order to steady and properly support the apparatus during a test operation, the body part 14b is shown provided with one or more legs 107 which can be adjustable, and which serve to engage the adjacent wall 12 of the compartment.

Operation of the apparatus described above can be reviewed as follows: The apparatus is coupled to a compartment to be tested and to a source of air under pressure, such as one or more compressed air flasks. Assuming that manual valves 11 and 58 are initially closed, valve 58 is opened to permit high pressure air to be supplied to the inlet of the main pressure reducing regulator 10. Pressure in the outlet passage 41 will assume a value dependent upon the loading pressure maintained in chamber 17. Assuming that petcock 103 is open and that manometer 97 is in a proper vertical position, the pressure for which the main regulator is set can be read and can be adjusted to a desired value by turning the knob 33. The operator now turns the hand wheel 68 of valve 11 and moves this valve to full open position. Because of the air pressure upon the valve member 66, such opening movement initially opens the secondary valve, and then moves the valve member 66 from the seat 73. Air now flows through the main regulator at a relatively high rate into the compartment, until the compartment pressure reaches substantially the pressure for which the regulator is set. The compartment pressure is transmitted to the chamber 18 below the diaphragm 16, whereby when the compartment pressure reaches the desired value, diaphragm 16 is operated to adjust the regulating valve means 38 to such a position that no further air under pressure is supplied. At this time both the manometers 96 and 97 should have substantially the same pressure reading, assuming that petcocks 103 and 106 are open. Having now built up the compartment pressure to a desired value, the operator turns hand wheel 68 to completely close the valve 11, whereby no air can flow from the compartment back to the regulator, and whereby the interior of the compartment is placed in communication with the pressure chamber of the manometer 96. Then readings are taken of the manometer 96 over a predetermined period of time, in order to detect possible leaks from the compartment.

It will be evident that the apparatus described above possesses many advantageous features. The regulating action is more accurate because the controlling pressure for application beneath the diaphragm 16 is taken from well within the compartment being tested. This has the further advantage of enabling the regulator to deliver full flow of air to the compartment while the compartment pressure is being developed, thus greatly reducing the filling time required. During the static pressure test period there is no opportunity for back leakage through the regulator, and here again the manometer accurately indicates the pressure within the compartment being tested. All of the foregoing advantages and features are obtained with relatively simple apparatus which can be readily manipulated by an operator. Only one connection to the compartment is required, and this one connection serves both the purpose of introducing air into the compartment, and enabling accurate indication of the pressure within the compartment.

I claim:

1. In a compartment tester, a pressure reducing regulator having inlet and outlet passages, said regulator including an operating diaphragm and means forming a chamber on one side of the same adapted to receive controlling gas pressure, piping connected to the outlet of the regulator, a coupling serving to connect the piping to a compartment to be tested, a manually operable shut-off valve in said piping, piping connecting said chamber with said compartment and extending through the first named piping and said coupling, and means for indicating pressure in said last named piping.

2. In a compartment tester, a pressure reducing regulator having inlet and outlet passages, said regulator including an operating diaphragm and means forming a chamber on one side of the same adapted to receive controlling gas pressure, piping connected to the outlet of the regulator, a coupling serving to connect the piping to a compartment to be tested, a manually operable valve in said piping and including a movable valve member, means serving to establish communication between said chamber and the interior of said compartment, said means including a second piping extending from said chamber through said coupling and a secondary valve formed on the movable valve member of said manually operable valve opened upon opening of the first valve to establish pressure communication through the second piping, and means for indicating the pressure in said second piping.

3. In a compartment tester, a pressure reducing regulator having inlet and outlet passages, piping connected to the outlet of the regulator, a coupling serving to connect the piping to a compartment to be tested, a manually operable valve in said piping to control fluid flow therethrough, said valve including a movable valve member, said pressure regulator including an operating diaphragm and means forming a chamber on one side of the same adapted to receive controlling gas pressure, a secondary valve formed on said valve member, flexible piping serving to connect said chamber to said valve member, piping serving to connect said valve member to the interior of the compartment through said coupling, said secondary valve member being arranged to either interrupt or establish communication between said chamber and the interior of the compartment through said last mentioned piping, and means serving to indicate fluid pressure in said last named piping.

4. In a compartment tester, a pressure reducing regulator having inlet and outlet passages, said regulator including an operating diaphragm, and means forming a chamber on one side of said diaphragm adapted to receive controlling gas pressure, piping adapted to be coupled to the compartment and serving to connect the outlet of the regulator to the compartment, a manally operable valve in said piping, said valve including a valve member movable in opposite directions between open and closed positions, a secondary valve formed in said valve member, said secondary valve being opened when said first named valve member is moved to open position and being closed when the first named valve member is moved to closed position, flexible piping serving to connect said chamber with said valve member and with the inflow side of said secondary valve, piping serving to connect said valve member with the interior of the compartment and also connecting with the outflow side of the secondary valve, pressure indicating means, and means including said secondary valve for establishing communication between said pressure indicating means and the interior of the compartment.

AUSTIN U. BRYANT.

REFERENCES CITED

The following references are of record in the file of this patent:

UNITED STATES PATENTS

| Number | Name | Date |
|---|---|---|
| 491,166 | Gold | Feb. 7, 1893 |
| 594,633 | Lunken | Nov. 30, 1897 |
| 851,555 | Norton | Apr. 23, 1907 |
| 1,825,744 | Landrum | Oct. 6, 1931 |
| 1,883,522 | Breer | Oct. 18, 1932 |
| 1,887,578 | Bush | Nov. 15, 1932 |
| 2,196,279 | Thomas | Apr. 9, 1940 |